US008588736B2

(12) United States Patent
Gorman et al.

(10) Patent No.: US 8,588,736 B2
(45) Date of Patent: Nov. 19, 2013

(54) SYSTEM AND METHOD FOR CAPTURING REAL TIME TELECOMMUNICATIONS USAGE DATA FROM MOBILE DEVICES AND COMPARING THAT DATA TO LIFE CYCLE TELECOMMUNICATIONS EXPENSE MANAGEMENT (TEM) DATA

(75) Inventors: Mike Gorman, Brambleton, VA (US); Hector Nevarez, Ashburn, VA (US); Tat Ng, Cary, NC (US); Sudarshan Ranganath, Falls Church, VA (US); John Shea, Vienna, VA (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 13/192,904

(22) Filed: Jul. 28, 2011

(65) Prior Publication Data

US 2012/0028603 A1 Feb. 2, 2012

Related U.S. Application Data

(60) Provisional application No. 61/368,539, filed on Jul. 28, 2010.

(51) Int. Cl.
*H04W 4/26* (2009.01)

(52) U.S. Cl.
USPC ............................................ 455/408; 455/419

(58) Field of Classification Search
USPC ............................... 455/407–409, 414.1, 419
See application file for complete search history.

(56) References Cited

U.S. PATENT DOCUMENTS

| | | |
|---|---|---|
| 2003/0193910 A1 | 10/2003 | Shoaib et al. |
| 2007/0254628 A1 | 11/2007 | Rybak |
| 2008/0052206 A1 | 2/2008 | Edwards et al. |
| 2009/0006200 A1 | 1/2009 | Baker et al. |

FOREIGN PATENT DOCUMENTS

WO    WO 2009/134417 A2    11/2009

OTHER PUBLICATIONS

International Search Report and Written Opinion for International Application No. PCT/US2011/045470, mailed Dec. 16, 2011.

*Primary Examiner* — Sam Bhattacharya
(74) *Attorney, Agent, or Firm* — Esther F. Queen; Moore & Van Allen PLLC

(57) ABSTRACT

In one embodiment, a signal having a real-time usage value associated with operation of a mobile device is received from the mobile device. Information on a service agreement for the mobile device is received. A command is sent to the mobile device when the operation of the mobile device crossed a threshold condition of the service agreement. The command is configured to cause the mobile device to implement an operational change at the mobile device in response to the command.

20 Claims, 2 Drawing Sheets

US 8,588,736 B2

SYSTEM AND METHOD FOR CAPTURING REAL TIME TELECOMMUNICATIONS USAGE DATA FROM MOBILE DEVICES AND COMPARING THAT DATA TO LIFE CYCLE TELECOMMUNICATIONS EXPENSE MANAGEMENT (TEM) DATA

CROSS-REFERENCE TO RELATED PATENT APPLICATIONS

This patent application claims priority to U.S. Patent Application No. 61/368,539 filed on Jul. 28, 2010 and entitled "System and Method for Capturing Real Time Telecommunications Usage Data from Mobile Devices and Comparing that Data to Life Cycle Telecommunications Expense Management (TEM) Data," which is incorporated herein by reference in its entirety.

BACKGROUND

Some embodiments relate to telecommunication systems including, for example, a telecommunication system for capturing real time telecommunications usage data from mobile devices and comparing that data to life-cycle telecommunications expense management (TEM) data.

Enterprise customers continue to face increasing telecommunications mobility costs. Moreover, carriers report mobility costs in the form of an invoice but these invoices can take a while to reach the enterprise customers. For example, some enterprise customers may receive invoices 30 days after mobility expenses have already been incurred. At the time of invoice receipt, some enterprise customers have little choice but to pay those expenses to carriers.

Enterprise customers also face challenges actively monitoring the quality of service their users receive from telecommunication mobility carriers. In many instances, enterprise customers do not actively monitor the quality of service their users receive. As a result, enterprise customers have difficulty recuperating (if at all) contractual monetary remedies from carriers whose quality of service is below contractually committed service level agreements (SLAs).

Thus, a need exists for a real-time telecommunications system that combines mobile usage data and TEM life-cycle management data to empower enterprises to (a) reduce mobility expenses and (b) enable collection of monetary remedies from carries due to missed, and contractually committed, quality of service levels.

SUMMARY

Figure 1:
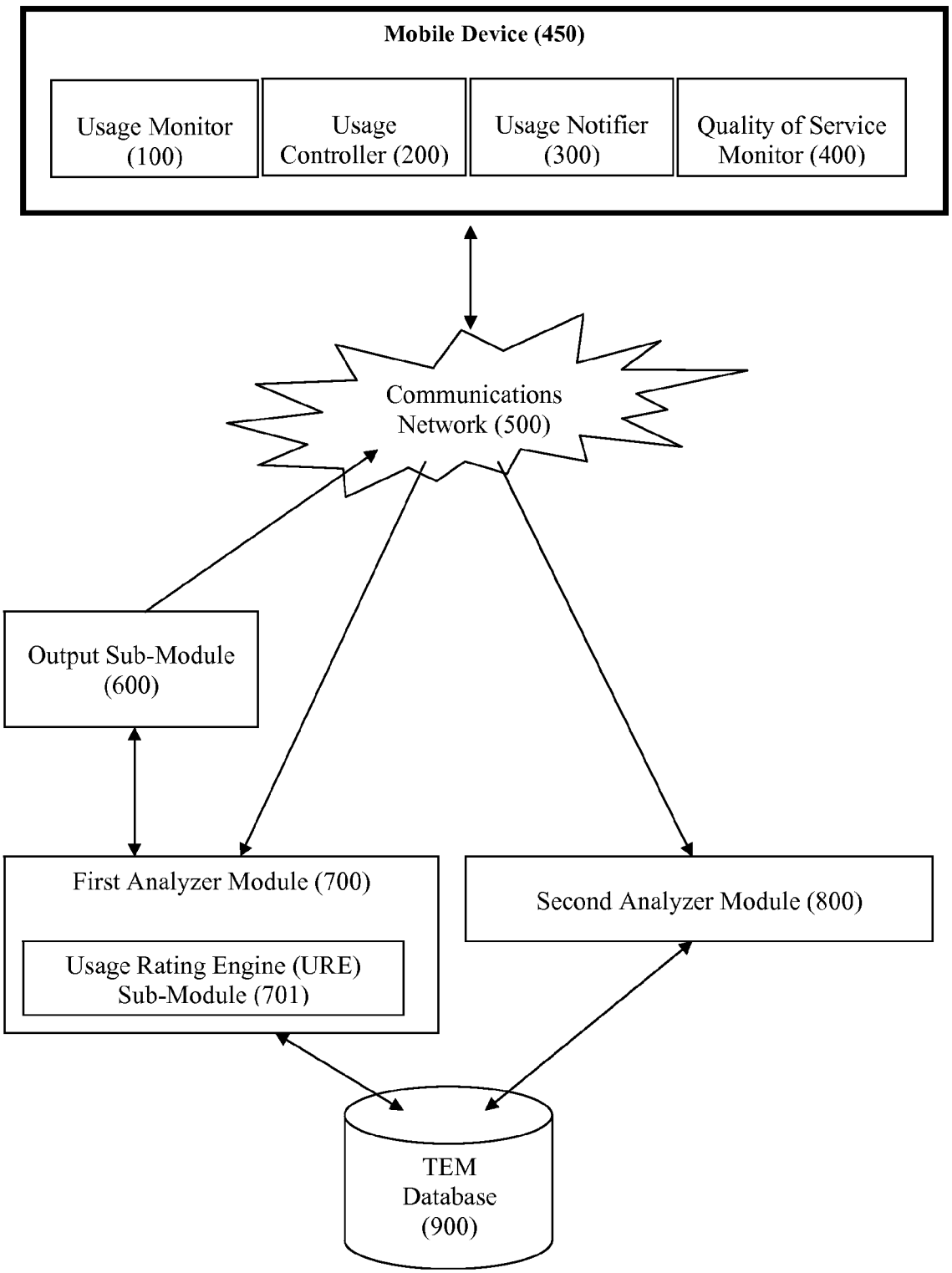
FIG. 1 is a schematic illustration of a communication system having an expense management system, according to an embodiment.

In one embodiment, a signal having a real-time usage value associated with operation of a mobile device is received from the mobile device. Information on a service agreement for the mobile device is received. A command is sent to the mobile device when the operation of the mobile device crossed a threshold condition of the service agreement. The command is configured to cause the mobile device to implement an operational change at the mobile device in response to the command.

DETAILED DESCRIPTION

In some embodiments, a system and method for capturing real time telecommunications usage data from mobile devices and comparing that data to life cycle telecommunications expense management (TEM) data is disclosed herein.

Some embodiments can proactively prevent unexpected, unplanned, or unbudgeted mobility expenses. Unlike TEM systems alone, these embodiments make use of TEM data and couple it with real-time mobility devices usage monitoring and real-time mobility devices usage alerts and/or controlling technology to prevent such expenses. Thus, enterprise customers will avoid unexpected mobility expenses, through behavior modifications or just-in-time rate plan and features changes, instead of finding those undesirable expenses in a carrier invoice 30 days later when the expense is already incurred.

Some embodiments will proactively prevent a number of different mobility expenses including, but not limited to, the following:

Unplanned High Cost "Roaming" Expenses
  Much higher mobility rates apply when a user is roaming outside his or her home region. Additionally, roaming can become extremely expensive when a user is roaming internationally.
Unplanned "Voice Minutes Overages" Expenses
  Higher mobility rates apply when a user exceeds allotted voice minutes in his or her mobility plan.
Unplanned "1-900 Dialing" Expenses
  1-900 calls are not free calls. The 1-900 numbers are commercial numbers which carry a significant mobility cost.
Unplanned "411 Dialing" Expenses
  411 (directory assistance) calls are not covered by standard rate plan fees. 411 calls are billed at a significant per minute rate.
Unplanned "Other Black-List Phone Numbers Usage" Expenses
  In addition to 1-900 and 411 calls, enterprises do not want to pay for calls to other black-list numbers. The invention allows enterprise administrators to define the black phone numbers list.
Unplanned "Kilobytes of Data" Usage Expenses
  Carrier data plans include in the standard monthly fee a "data cap" (in Kilobytes—KBs-) a user can consume in a monthly period. Data usage beyond the plan cap is billed at significantly higher rates. The data rate is even higher when a user is outside his or her home region (e.g. roaming internationally). Data usage also includes other chargeable usage events such as ringtone, game, and application downloads.
Unplanned "Text Messaging" Expenses
  Carrier data plans include in the standard monthly fee a "text cap" (in number of text messages) a user can consume in a monthly period. Text messaging beyond the plan cap is billed at significantly higher rates. Texting rates are even higher when a user is outside his or her home region (e.g., roaming internationally).
Unplanned "SMS/MMS" (Short Message Service/Multimedia Message Service) Expenses
  Carrier data plans include in the standard monthly fee an "SMS/MMS cap" (in number of SMS/MMS messages) a user can consume in a monthly period. SMS/MMS messaging beyond the plan cap is billed at significantly higher rates. SMS/MMS message rates are even higher when a user is outside his or her home region (e.g. roaming internationally)
Unplanned "Web Browsing" Expenses Carrier plans and available mobility devices provide users the ability to browse the Internet. There may be a "data cap" (in number of kilo-bytes transferred) allowed in the plan. Web Browsing can significantly contribute to data usage. Enterprise customers may want to prevent their employees from browsing the internet and instead make use of the plan data cap performing corporate related functions such as communicating via email, uploading sales presentations to prospects, and others.

Some embodiments also monitor in real-time mobility carriers quality of service and automatically compute contractual monetary remedies a carrier should pay enterprise customers when quality of service falls below contractually agreed service levels. Unlike TEM systems alone, these embodiments make use of TEM data but couple it with real-time mobility devices quality of service monitoring. These embodiments are hence enabled to monitor real-time carrier service quality and compare against carriers Service Level Agreement (SLA) in the TEM database. This result in calculated monetary remedies an enterprise can recuperate from mobility carriers.

Some embodiments will automatically compute monetary remedies due to enterprise customers from mobility carriers resulting from quality of service below contractually committed service levels.

FIG. 1 is a schematic illustration of a communication system having an expense management system, according to an embodiment. The communication system can proactively prevent one or more of the mobility expenses discussed above. The communication system includes a mobile device 450, a communications network 500 and an expense management system having a first analyzer module 700, a second analyzer module 800 and a TEM database 900. The communications network 500 is configured to facilitate communication between various portions of the communication system (e.g., the mobile device 450, output sub-module 600, first analyzer module 700, second analyzer module 800, and TEM database 900). The communications network 500 can be any suitable communications network, such as, for example, an internet, an intranet, a mobile service provider network and/or the like.

The TEM database 900 can be configured to contain telecommunication information, such as a carrier(s) rate plan data. For example, in some embodiments, the TEM database 900 contains the home location of the mobile device 450. The home location will help identify when the mobile device 450 is roaming outside of its home location or home country (e.g., international roaming). In some embodiments, the TEM database 900 contains the voice minute information of the mobile device 450. Such voice minute information can include the total voice minutes in the mobile plan, the mobile-to-mobile minutes, the night and weekend minutes, the unlimited minutes, and all other like voice minutes classifications included in mobile device plan. Additionally, the voice minute information can include the per voice minute rate beyond the in-plan voice minutes cap specified in the mobile device plan. In some embodiments, the TEM database 900 contains the data information in the mobile device plan of the mobile device 450. Such data information can include the total amount of kilobytes (i.e., the data cap) in the plan and the per kilobyte rate beyond the in-plan data cap. In other embodiments, the TEM database 900 contains the number of text messages in the mobile device plan of the mobile device 450, such as the number of text messages cap and/or the per text message fee beyond the in-plan cap specified in the mobile device plan. In yet other embodiments, the TEM database 900 contains the number of SMS messages in the mobile device plan of the mobile device 450, such as the number of SMS messages cap and/or the per SMS message fee beyond the in-plan cap specified in the mobile device plan.

The TEM database 900 can also be configured to contain a carrier(s) contract data. For example, in some embodiments, the TEM database 900 contains the per carrier "service availability" metric specified in a Service Level Agreement (SLA) or other like agreement. For example, a SLA can specify that the network availability for carrier A is 95% on a rolling three month average. The same SLA can also specify that if this SLA term is not met, the monetary remedies will equal to 2% of the mobile device invoice for each month in violation. In some embodiments, the TEM database 900 contains the per carrier "drop calls" metric specified in the SLA or other like agreement. For example, a SLA can specify that dropped calls will not be higher that 5% of total monthly calls on a rolling three moth average. The same SLA will also specify that if this SLA term is not met, the monetary remedies will equal to 2% of the mobile device invoice for each month in violation. The TEM database 900 can be, for example, similar to any one of the TEM databases illustrated and described in U.S. Patent Publication No. 2010/0049587, filed Feb. 25, 2009 and entitled "System and Method for Using Lifecycle Telecommunications Expense Management (TEM) Data to Predict the Outcome of Changes to Telecommunications Infrastructure," which is incorporated by reference in its entirety.

The mobile device 450 can be any suitable telecommunications device, such as, for example, a cellular/mobile phone. The mobile device 450 includes a usage monitor 100, a usage controller 200, a usage notifier 300, and a quality of service monitor 400. The usage monitor 100 is housed within the mobile device 450 and is configured to capture the real-time usage data of the mobile device 450. For example, the usage monitor 100 can continually monitor the mobile device 450 and collect real-time mobile device roaming detection and communication of roaming status, real-time mobile device usage of voice minutes detection and communication of voice minutes usage status, real-time mobile device 1-900 numbers dialing detection and communication of 1-900 number dialing attempts, real-time mobile device 411 number dialing detection and communication of 411 number dialing attempts, real-time mobile device black listed phone numbers dialing detection and communication of black listed phone numbers dialing attempts, real-time mobile device usage of data (in Kilobytes) detection and communication Kilobytes usage of data status, real-time mobile device usage of number of test messages detection and communication number of text messages usage of data status, real-time mobile device usage of number of SMS messages detection and communication of number of SMS messages usage status, real-time mobile device web browsing detection and communication of web browsing attempts, and/or the like. Once this information has been collected from the mobile device 450 by the usage monitor 100, the usage monitor 100 can transmit the real-time data to the first analyzer module 700 via the communications network 500.

The usage controller 200 is housed within the mobile device 450 and is configured to execute the commands issued by an output sub-module 600 of the first analyzer module 700. More specifically, the usage controller 200 is configured to receive commands from the output sub-module 600 and to facilitate execution of those commands in the mobile device 450. For example, the usage controller 200 can execute a mobile device shut down command(s), a mobile device voice calling shut down command(s), a mobile device block phone number(s) dialing command(s), a mobile device data usage shut down command(s), a mobile text messaging shut down command(s), a mobile SMS messaging shut down command(s), a mobile device web browsing or web access block command(s) and/or the like. Once the commands are executed, the usage controller 200 can send a message to the first analyzer module 700 confirming that the execution of the issued commands is complete. In some embodiments, the usage controller 200 is configured to confirm that the commands were properly and/or completely executed within the mobile device 450 prior to sending the confirmation message to the first analyzer module 700.

The usage notifier 300 is housed within the mobile device 450 and is configured to issue notifications to the mobile device 450 based on the notification commands issued by the output sub-module 600 of the first data analyzer 700. More specifically, the usage notifier 300 is configured to receive notification commands from the output sub-module 600 and facilitate execution of those notification commands in the mobile device 450. The usage notifier 300 can generate one or more user notifications in the form of a mobile device popup window(s), an email message(s), a mobile device text message(s), a mobile device SMS message(s), making a mobile device vibrate or ring, and/or the like. Once the notifications are generated and executed, the usage notifier 300 can send a message to the first analyzer module 700 confirming that the execution is complete. In some embodiments, the usage notifier 300 is configured to confirm that the notification commands were properly and/or completely executed within the mobile device 450 prior to sending the confirmation message to the first analyzer module 700.

The quality of service monitor 400 is housed within the mobile device 450 and is configured to capture the real-time quality of service data of the mobile device 450. More specifically, the quality of service monitor 400 is configured to continually monitor and collect real-time mobile quality of service detection and communication of quality of service status, real-time mobile detection of dropped calls and communication of dropped calls status and/or the like. Once this information has been collected from the mobile device 450 by the quality of service monitor 400, the quality of service monitor 400 can transmit the real-time data to the second analyzer module 800.

The first analyzer module 700 (e.g., a real-time usage data to TEM data analyzer) is a policy engine configured to determine the course of action when a specific usage condition or threshold is met. The first analyzer module 700 includes the output sub-module 600 and a usage rating engine (URE) sub-module 701. The first analyzer module 700 can be configured to receive data from the usage monitor 100 (e.g., when the mobile phone 450 is deployed in the field) and to communicate that data to the URE sub-module 701. As will be described in more detail, the URE sub-module 701 can determine if a specific real time usage event is an unforeseen cost event or not based on data from the TEM database 900 (e.g., a user carrier rate plan). If the real time usage event is identified as an unforeseen cost event, the first analyzer module 700 can use the algorithms and pre-defined administration policies contained therein to determine the next course of action. The algorithms contained within the first analyzer module 700 are designed to compare the data from the TEM database 900 to the real-time usage data received from the usage monitors 100.

The URE sub-module 701 is configured to ascribe cost to each usage event reported by the usage monitor 100 of the mobile device 450. The URE sub-module 701 is configured to evaluate each usage event substantially the same as the carrier would evaluate it. More specifically, the URE sub-module 701 is configured to access, collect, and then use carrier rate plan contract data from the TEM database 900 to interpret the real time usage event in substantially the same way a carrier would. In some embodiments, the first analyzer module 700 is configured to access the TEM database 900 and collect relevant information to send to the URE 701. Using the information from the TEM database 900 and the data received from the usage monitor 100, the URE sub-module 701 can ascribe cost to a voice usage event and can determine the following:

Whether the Voice Minute is Within the "Nights and Weekend" Plan Minutes

If call is within plan minutes, the call is not ascribed an unforeseen cost and notification to the user will not be issued.

If call is not within plan minutes, the call is ascribed an unforeseen cost and a notification to the user will be issued.

Whether the Voice Minute is Within the "Mobile to Mobile" Plan Minutes

If call is within plan minutes, the call will not be ascribed an unforeseen cost and a notification to the user will not be issued.

If call is not within plan minutes, the call is ascribed an unforeseen cost and a notification to the user will be issued.

Whether the Voice Minute is Within the "Peak" Plan Minutes

If call is within plan minutes, the call will not be ascribed an unforeseen cost and a notification to the user will not be issued.

If call is not within plan minutes, the call is ascribed an unforeseen cost and a notification to the user will be issued.

Whether the Voice Minute is Within the "Off-Peak" Plan Minutes

If call is within plan minutes, the call will not be ascribed an unforeseen cost and a notification to the user will not be issued.

If call is not within plan minutes, the call is ascribed an unforeseen cost and a notification to the user will be issued.

Whether the Voice Minute is Within the "Shared Plan" Minutes

If call is within plan minutes, the call will not be ascribed an unforeseen cost and a notification to the user will not be issued.

If call is not within plan minutes, the call is ascribed an unforeseen cost and a notification to the user will be issued.

Whether the Voice Minute is Within the "Pooled Plan" Minutes

If call is within plan minutes, the call will not be ascribed an unforeseen cost and a notification to the user will not be issued.

If call is not within plan minutes, the call is ascribed an unforeseen cost and a notification to the user will be issued.

As described in more detail herein, the URE sub-module 701 of the first analyzer module 700 can also ascribe costs to a text message usage event, an SMS/MMS usage event, and/or a data usage event. Additionally, as described in more detail herein, the URE sub-module 701 can be a self-correcting engine.

The output sub-module 600 of the first analyzer module 700 is configured to communicate commands or other action messages to the usage controller 200 of the mobile device 450 and/or the usage notifier 300 of the mobile device 450, as described above. The output sub-module 600 can be configured to send any suitable command or other action message to the usage controller 200 of the mobile device 450, such as, for example, a mobile device shut down command(s), a voice calling shut down command(s), a block phone number(s) dialing command(s), a data usage shut down command(s), a text messaging shut down command(s), an SMS messaging shut down command(s), a web browsing shut down command(s) and/or the like. Similarly, the output sub-module 600 can be configured to send any suitable command or other action message to the usage notifier 300 of the mobile device 450, such as, for example, a window popup user notification(s), an email message notification(s), a text message notification(s), a SMS message notification(s), a device vibrate or a device ring notification(s) and/or the like.

The second analyzer module 800 (e.g., a real-time quality of service data to TEM data analyzer) is a policy engine that is configured to determine the course of action when a specific condition or threshold is met. The second analyzer module 800 is configured to receive data from the quality of service monitor 400 (e.g., when the mobile phone 450 is deployed in the field) as well as data from the TEM database 900. The second analyzer module 800 contains algorithms and pre-defined administration policies, which are used to determine the next course of action for the second analyzer module 800. The algorithms contained within the second analyzer module 800 are also designed to compare the data from the TEM database 900 to the real-time quality of service data received from the quality of service monitor 400.

In some embodiments, the second analyzer module 800 automatically computes the contractual monetary remedies a carrier will pay enterprise customers when the contractual service availability agreement metric is not met. For example, the second analyzer module 800 will receive a real time quality of signal metric data from the quality of service monitor 400 signaling that carrier A mobile service was available 96% of the time in month one (1), 90% of the time in month two (2), and 85% of the time in month three (3) for the mobile device 450. The second analyzer module 800 can pull service availability contractual agreement data from the TEM database 900. For the purpose of this example, the contractual agreement is 95% availability on a rolling three month average and the monetary remedy associated to missing this contractual SLA is to 2% of the mobile device invoice for each month in violation. The second analyzer module 800 can then calculate carrier A averaged a service availability of 90.33% over the 3 month period. The second analyzer module 800 can automatically calculate the monetary remedy based on this SLA violation and notify enterprise telecommunication managers that the enterprise needs to file an invoice dispute equal to 2% of the total invoice amounts for months two and three.

In another example, the second analyzer module 800 can receive real-time quality-of-signal metric data from the quality of service monitor 400 signaling that carrier A mobile service had dropped calls at a rate of 6% in month one (1), 4% in month two (2), and 7% in month three (3) for the mobile device 450. The second analyzer module 800 can pull service availability contractual agreement data from the TEM database 900 in the same manner described above. For the purpose of this particular example, the contractual agreement states that the quality-of-service-for-dropped-calls cap is 5% of total monthly calls on a rolling three month average. The same contract can also specify that if this SLA term is not met, the monetary remedies will equal to 2% of the mobile device invoice for each month in violation. The second analyzer module 800 can then calculate carrier A averaged quality of service for dropped calls of 5.66% over the 3 month period.

The second analyzer module 800 can automatically calculate the monetary remedy based on this SLA violation and notify enterprise telecommunication managers that the enterprise should file an invoice dispute equal to 2% of the total invoice amounts for months 1 and 3.

Operationally, the first analyzer module 700, the URE sub-module 701, the output sub-module 600, the usage monitor 100, the usage controller 200, and the usage notifier 300 are primarily associated with preventing unplanned and unbudgeted usage-related mobility costs. The second analyzer module 800 and the quality of service monitor 400 are primarily associated with collecting monetary remedies from carriers due to missed quality of service SLA metrics.

In a first operational example, the usage monitor 100 of the mobile device 450 can detect that the mobile device 450 is outside of its home region and send (i.e., transmit) a message to the first analyzer module 700 indicating the same. The result of the mobile device 450 roaming outside of its home region can be excessive communication costs. To avoid these potential costs, any one of the following are possible.

First, in some embodiments, the output sub-module 600 of the first analyzer module 700 can send a message to the usage notifier 300 of the roaming mobile device 450. The usage notifier 300 will then generate a message that notifies the user that he or she is roaming and that high costs will result if the usage status quo continues. In some embodiments, the output sub-module 600 of the first analyzer module 700 can send a message to the system administrator of the mobile device 450. The message can be sent to the usage notifier (similar to usage notifier 200) in the system administrator's mobile device or it can be sent to the system administrator's user interface in the form of a pop-up window (e.g., an application connected to the first analyzer module 700). In such an embodiment, the system administrator can take action and proactively change the user's mobile device plan to a more appropriate plan, thereby preventing excessive costs due to roaming.

Additionally, in some embodiments, the roaming mobile device 450 can be automatically shut down. More specifically, the output sub-module 600 of the first analyzer module 700 can send a mobile-device shut-down command to the usage controller 200 of the mobile device 450, which the usage controller 200 will then execute. The roaming charges will be avoided because the mobile device 450 will stop operating. This embodiment may be used when the first analyzer module 700 indicates that the corporate policy associated with the mobile device 450 is "no roaming allowed." Finally, in some embodiments, the described process can be executed a workflow (an arbitrary sequence of steps that may be configured to perform a variety of work including calling a web service, executing a job, updating data, or assigning a user a task.)

In a second operational example, the usage monitor 100 of the mobile device 450 can detect when the mobile device 450 has reached the limit of voice minutes in the mobile device carrier plan and send (e.g., transmit) a message to the first analyzer module 700 indicating the same. The result of the mobile device 450 going over the voice minutes limit can be excessive communication costs. To avoid these potential costs, the system can operate in any one of the following are possible.

First, in some embodiments, the output sub-module 600 of the first analyzer module 700 can send a message to the usage notifier 300 of the mobile device 450. The usage notifier 300 will then generate a message that notifies the user that he or she has reached the allotted voice minutes limit and that high costs will result if the usage status quo continues. In some embodiments, the output sub-module 600 of the first analyzer module 700 can send a message to the system administrator of the mobile device 450. The message can be sent to the usage notifier (similar to usage notifier 200) in the system administrator's mobile device or it can be sent to the system administrator's user interface in the form of a pop-up window (e.g., an application connected to the first analyzer module 700). In such an embodiment, the system administrator can take action and proactively change the user's mobile device plan to a more appropriate plan (e.g., a plan with additional voice minutes), thereby preventing excessive costs due to voice minutes overage.

Additionally, in some embodiments, the mobile device 450 can be automatically shut down (in the same manner described above) so that voice minutes overage charges will be avoided. This embodiment can be used when the first analyzer module 700 indicates that the corporate policy associated with the mobile device 450 is "no overage allowed." Finally, in some embodiments, the described process can be executed a workflow (an arbitrary sequence of steps that may be configured to perform a variety of work including calling a web service, executing a job, updating data, or assigning a user a task.)

These same operations can be performed when the usage monitor 100 detects that the mobile device 450 has, for example, reached the limit of data (in kilobytes) in the mobile device carrier plan, reached the limit of text messages in the mobile device carrier plan, or reached the limit of SMS messages in the mobile device carrier plan.

In a third operational example, the usage monitor 100 of the mobile device 450 can detect when the mobile device 450 is attempting to dial a 411 number (or any number where charges for calling are involved) and send (e.g., transmit) a message to the first analyzer module 700 indicating the same. The result of the mobile device 450 calling the 411 number can be excessive communication costs. To avoid these potential costs, the system can operate in any one of the following manners.

First, in some embodiments, the output sub-module 600 of the first analyzer module 700 can send a message to the usage notifier 300 of the mobile device 450. The usage notifier 300 will then generate a message that notifies the user that he or she will incur costs due to the 411 call. At this point, the user can decide if he or she would like to continue with the call. If the user decides to drop the call then no charged will be accrued. If the user decides to continue with the call, then a charge will be added to the user's account. In some embodiments, the system will automatically shut down the mobile device 450 (in the same manner described above) so that charges associated with the 411 call will be avoided. This embodiment may be used when the first analyzer module 700 indicates that the corporate policy associated with the mobile device 450 is "no 411 calls allowed."

Additionally, in some embodiments, the 411 call can be redirected to a free 411 service, such as, for example, the free Google 411 Directory Assistance service (1-800-GOOG-411). More specifically, once a 411 call is detected, the output sub-module 600 of the first analyzer module 700 will issue and send a re-direct dial command to the usage controller 200, which will then execute the command in the mobile device 450. The charges associated with the 411 call will be avoided because the mobile device 450 is instead re-directed to use the free 411 service. Finally, in some embodiments, the described process can be executed a workflow (an arbitrary sequence of steps that may be configured to perform a variety of work including calling a web service, executing a job, updating data, or assigning a user a task.)

As discussed above, these same operations can be performed when the mobile device 450 dials any number (e.g., a 1-900 number) where charges for calling are involved.

In a fourth operational example, the usage monitor 100 of the mobile device 450 can detect when the mobile device 450 is attempting to dial a corporate "black list" number and send (i.e., transmit) a message to the first analyzer module 700 indicating the same. The result of the mobile device 450 calling the corporate "black list" number can be excessive communication costs. To avoid these potential costs, the expense management system can operate in any one of the manners discussed above. For example, the usage notifier 300 can generate a message notifying the user that costs will accrue if the corporate "black list" number is dialed and, as discussed above, the user has the option of continuing the call or terminating the call. Similarly, the call can be blocked in the same manner described above.

In another operation example, the usage monitor 100 of the mobile device 450 can detect when the mobile device 450 is attempting to dial a corporate "black list" number and send (e.g., transmit) a message to the first analyzer module 700 indicating the same. The result of the mobile device 450 calling the corporate "black list" number can be excessive communication costs. To avoid these potential costs, the expense management system can operate in any one of the manners discussed above. For example, the usage notifier 300 can generate a message notifying the user that costs will accrue if the corporate "black list" number is dialed and, as discussed above, the user has the option of continuing the call or terminating the call. Similarly, the call can be blocked in the same manner described above.

In yet another operational example, the usage monitor 100 of the mobile device 450 can detect when the mobile device 450 is attempting to access a web page (or other online site) using the web browser of the mobile device 450. The usage monitor 100 can then send (i.e., transmit) a message to the first analyzer module 700 indicating the same. The result of the mobile device 450 accessing the web page (or other online site) can be excessive communication costs. To avoid these potential costs, the expense management system can operate in any one of the manners discussed above. For example, the usage notifier 300 can generate a message notifying the user that costs will accrue if the web page (or other online site) is accessed and, as discussed above, the user has the option of continuing web access or terminating web access. Similarly, the web access can be blocked in the same manner described above.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, the mobile device 450 can be any one of the following devices: a Blackberry OS device, a Windows Mobile OS device, a Windows CE OS device, an iPhone OS device, an Android device, a Symbian OS device, a Palm WebOS device, a Bada OS device, a Maemo OS device, a mobile phone, a mobile computer, a tablet PC device, a Wi-Fi device, a Mi-Fi device, a Broadband device, a wireless modem device and/or the like. In some embodiments, the mobile device 450 can be any suitable machine to machine device having mobility capabilities, such as, for example, an ATM machine or a point of sales machine.

Although FIG. 1 shows and is described as operating with respect to a single mobile device 450, it should be understood that any number of mobile devices can be present. For example, in some embodiments, 100 mobile devices or 1000 mobile devices can be present. In some such embodiments, each mobile device includes a usage monitor 100, a usage controller 200, a usage notifier 300, and a quality-of-service monitor 400, which can be disposed therein.

Although the usage monitor 100, the usage controller 200, the usage notifier 300, and the quality-of-service monitor 400 are each illustrated in FIG. 1 and described as being housed within the mobile device 450, in other embodiments, any one of the usage controller 200, the usage notifier 300, and/or the quality-of-service monitor 400 can be disposed outside of (or partially outside of) the mobile device 450. In some embodiments, any one of the usage controller 200, the usage notifier 300, and/or the quality-of-service monitor 400 can be configured to operate with more than one mobile device. For example, the usage monitor 100 can be configured to monitor the usage data in more than one mobile device (e.g., ten mobile devices). In this manner, the usage monitor 100 can be configured to transmit the collected usage data from each of the mobile devices it monitors to the first analyzer module 700.

In some embodiments, the URE sub-module 701 of the first analyzer module 700 ascribes the cost to a text usage event and determines if the text is within the plan text package. If the text is within plan package, the text or SMS/MMS event is not ascribed an unforeseen cost and notification to the user will not be issued. If text is not within plan package, the text is ascribed an unforeseen cost and a notification to the user will be issued.

Similarly, the URE sub-module 701 of the first analyzer module 700 can ascribe cost to a SMS/MMS usage event and determine if the SMS/MMS is within the plan package. If SMS/MMS is within plan package, the SMS/MMS event is not ascribed an unforeseen cost and notification to the user will not be issued. If SMS/MMS is not within plan package, the SMS/MMS is ascribed an unforeseen cost and a notification to the user will be issued.

Likewise, the URE sub-module 701 of the first analyzer module 700 can ascribe cost to a data usage event and determine if the unit of data (e.g., kilobyte) is within the plan data package. If the unit of data is within plan package, the data event is not ascribed an unforeseen cost and notification to the user will not be issued. If the unit of data is not within plan package, the data event is ascribed an unforeseen cost and a notification to the user will be issued.

In some embodiments, the URE sub-module 701 of the first analyzer module 700 is a self-correcting engine. For example, the URE sub-module 701 can ascribe costs to usage events based on the most up-to-date TEM information in the TEM database 900. As the information in the TEM database 900 changes due to modifications of mobile plans, the URE sub-module 701 can self-correct its cost ascribing algorithms to account for the changes. Such changes can include changes to voice minutes plans, text plan packages, SMS/MMS plan packages, data plan packages, international voice plans, international text plans, international SMS/MMS plans, and international data plans.

The URE sub-module 701 of the first analyzer module 700 can also self-correct in real time by comparing the current ascribed cost of each usage event with the actual cost charged by the carrier. Said another way, the URE sub-module 701 can analyze ascribed costs to every usage event against the call detail records from the carrier. This comparison allows the URE sub-module 701 to more clearly define usage ascribed cost algorithms so the calculations, over time, are more precise to actual carrier charges for those usage events.

In some embodiments, one or more modules or components of the mobile device 450 (e.g., the usage monitor 100, the usage controller 200, the usage notifier 300, and/or the quality of service monitor 400) can be constructed from, based on or populated by a collection of spreadsheets, word documents, flat text files, and/or the like. In other embodiments, one or more components of the mobile device 450 can be constructed from, based on or populated by a database in any one of an intranet, internet, client server computing environment, and/or the like. Data can be input into one or more components of the mobile device 450 via paper forms, spreadsheets, or computer based forms in an intranet, internet, or client server computing environment. Further, one or more components of the mobile device 450 can operate, for example, based on manual technology processes, proprietary technology processes, and/or with commercial off-the-shelf technology processes.

In some embodiments, the components of the mobile device 450 (e.g., the usage monitor 100, the usage controller 200, the usage notifier 300, and/or the quality of service monitor 400) can be implemented as agents that are loaded or installed onto the mobile device 450. In such embodiments, the usage monitor 100, the usage controller 200, the usage notifier 300, and/or the quality of service monitor 400 can be configured to communicate with the expense management system. For example, the mobile device 450 can be manufactured by one entity while the usage monitor 100, the usage controller 200, the usage notifier 300, and/or the quality of service monitor 400 are provided by the same entity that controls the expense management system.

In some embodiments, the TEM database 900 can be constructed from, based on or populated by a collection of spreadsheets, word documents, flat text files, and/or the like. In other embodiments, the TEM database 900 can be constructed from, based on or populated by a database in any one of an intranet, internet, client server computing environment, and/or the like. Data can be input into the TEM database 900 via paper forms, spreadsheets, or computer based forms in an intranet, internet, or client server computing environment. Further, the TEM database 900 can operate, for example, based on manual technology processes, proprietary technology processes, and/or with commercial off-the-shelf technology processes.

Similarly, in some embodiments, the first analyzer module 700 and/or any one of its sub-modules (i.e., the output sub-module 600 and the URE sub-module 701) can be constructed from, based on or populated by a collection of spreadsheets, word documents, flat text files, and/or the like. In other embodiments, the first analyzer module 700 and/or any one of its sub-modules can be constructed from, based on or populated by a database in any one of an intranet, internet, client server computing environment, and/or the like. Data can be input into the first analyzer module 700 and/or any one of its sub-modules via paper forms, spreadsheets, or computer based forms in an intranet, internet, or client server computing environment. Additionally, the first analyzer module 700 and/or any one of its sub-modules can operate, for example, based on manual technology processes, proprietary technology processes, and/or with commercial off-the-shelf technology processes. Further, any of the calculations made by the first analyzer module 700 and/or any one of its sub-modules can be via a series of mathematical algorithms performed manually or automatically by computing equipment in an intranet, internet, and/or client server environment.

Finally, in some embodiments, the second analyzer module 800 (including any of its components or sub-modules) can be constructed from, based on or populated by a collection of spreadsheets, word documents, flat text files, and/or the like. In other embodiments, the second analyzer module 800 can be constructed from, based on or populated by a database in any one of an intranet, internet, client server computing environment, and/or the like. Data can be input into the second analyzer module 800 via paper forms, spreadsheets, or computer based forms in an intranet, internet, or client server computing environment. Additionally, the second analyzer module 800 can operate, for example, based on manual technology processes, proprietary technology processes, and/or with commercial off-the-shelf technology processes. Further, any of the calculations made by the second analyzer module 800 can be via a series of mathematical algorithms performed manually or automatically by computing equipment in an intranet, internet, and/or client server environment.

Any one of the components discussed above with respect to FIG. 1 (e.g., components 100, 200, 300, 400, 450, 500, 600, 700, 701, 800 and/or 900) can include or be embodied on a non-transitory computer-readable medium (also can be referred to as a processor-readable medium) having instructions or computer code thereon for performing various computer-implemented operations for example when executed on a processor or computer. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Figure 2:
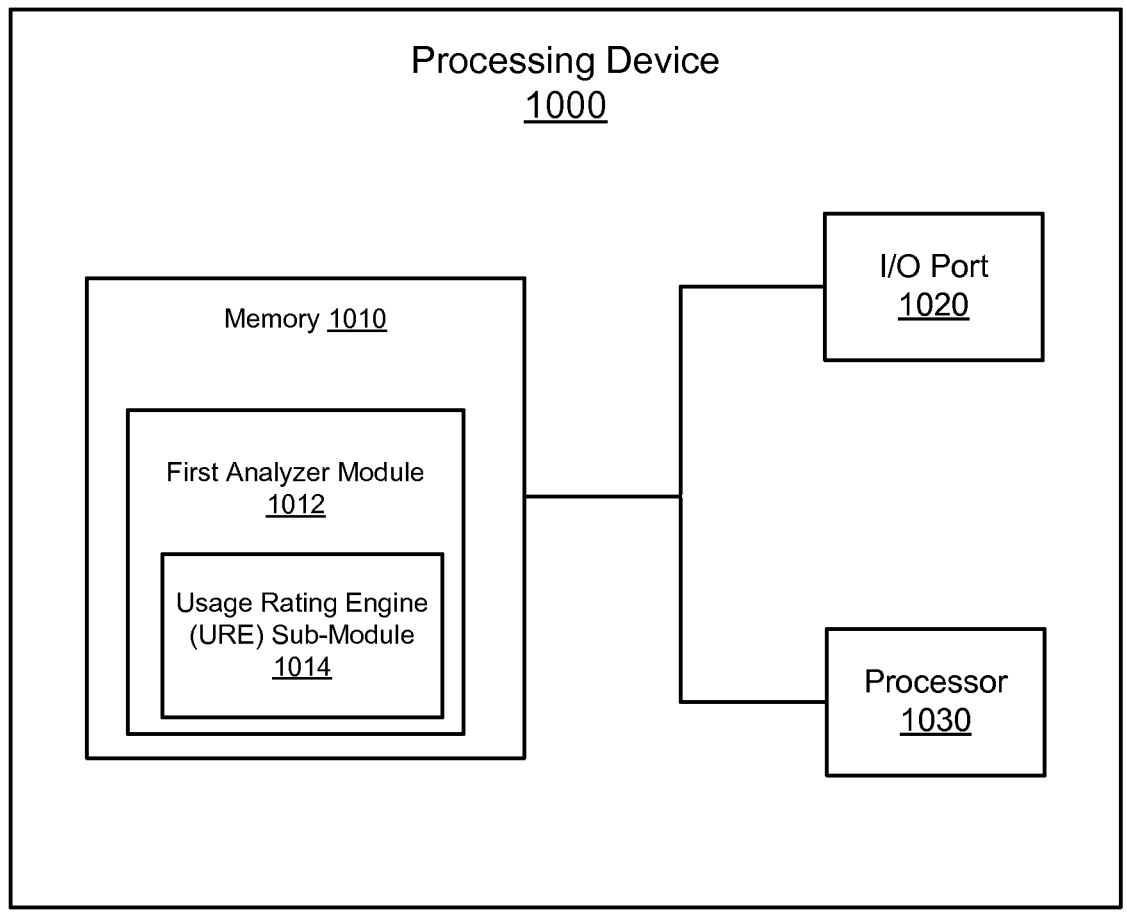
FIG. 2 is a schematic illustration of a processing device, according to an embodiment.

FIG. 2 is a schematic diagram that illustrates a processing device, according to an embodiment. The processing device 1000 can be an implementation of the first analyzer module 700 shown in FIG. 1. Although not shown in FIG. 2, second analyzer module 800 and output sub-module 600 can be implemented in a manner similar to that shown for processing device 1000.

As shown in FIG. 2, the processing device 1000 includes a memory 1010, input/output (I/O) port 1020 and processor 230. Memory 1010 includes first analyzer module 1012, which includes usage rating engine (URE) sub-module 1014. Memory 1010, I/O port 1020 and processor 1030 are in communication with each other.

Memory 1010 can be any valid memory, such as, for example, a read-only memory (ROM) or a random-access memory (RAM). In some embodiments, the memory 1010 can be, for example, any type of processor-readable media, such as a hard-disk drive, a flash memory card, or other portable digital memory type. The memory 1010 can optionally be configured to send signals to and receive signals from the I/O port 1020, and/or the processor 1030.

The I/O port 1020 can be any valid combination of hardware and/or software (stored in and/or executing on hardware) configured to receive information at and transmit data from the processing device1 1000. In some embodiments, the I/O port 1020 can be a hardware network communication device and/or a software module configured to format and transmit data to and from the hardware communication device. For example, in some embodiments, the I/O port 1020 can include network interface card (NIC), such as a wired and/or wireless Ethernet card, and an associated software device driver. As shown in FIG. 2, the I/O port 1020 can also transmit signals to and receive signals from the memory 1010 and/or the processor 1030.

The processor 1030 can be any valid hardware processor configured to execute instructions, such as computing instructions included in and/or defined by the first analyzer module 1012 and/or the URE sub-module 1014. The processor 1030 can be, for example, an application-specific integrated circuit (ASIC), a digital signal processor (DSP), a field programmable gate array (FPGA), etc. As shown in FIG. 2, the processor 1030 can transmit signals to and receive signals from the memory 1010 and/or the I/O port 1020. In some embodiments, the processor 1030 can access computing instructions in the memory 1010 for execution at the processor 1030 and then transmit information, including computed results, to the I/O port 1020 for transmission from the processing device.

The first analyzer module 1012 can any valid combination of hardware and/or software (stored in and/or executing on hardware) configured to perform the functions described above in connection with first analyzer module 700. Similarly, URE sub-module 1014 can any valid combination of hardware and/or software (stored in and/or executing on hardware) configured to perform the functions described above in connection with URE sub-module 701.

Although various embodiments have been described as having particular features and/or combinations of components, other embodiments are possible having a combination of any features and/or components from any of the embodiments where appropriate.

What is claimed is:

1. A non-transitory processor-readable medium storing code representing instructions to be executed by a processor, the code comprising code to cause the processor to:
   receive from a mobile device at a device separate from the mobile device a first signal having a real-time usage value associated with operation of the mobile device and a second signal having a real-time quality-of-service data associated with operation of the mobile device;
   receive at the device information on a service level agreement for the mobile device, the service level agreement being between a carrier and a carrier customer;
   send a first command from the device to the mobile device when the operation of the mobile device crossed a first threshold condition of the service level agreement, the first command configured to cause the mobile device to implement an operational change at the mobile device in response to the command; and send a second command from the device to an enterprise telecommunications manager associated with the mobile device when the operation of the mobile device crosses a second threshold condition of the service level agreement, the second command having an indication of a contractual monetary remedy due from a carrier associated with the service level agreement when the quality of service falls below contractually agreed service levels.

2. The non-transitory processor-readable medium of claim 1, further comprising code to cause the processor to:
receive from a database a plurality of usage values associated with prior operation of the mobile device; and
calculate a cost for the operation of the mobile device based on the service level agreement, the real-time usage value and the plurality of usage values, the threshold condition being associated with the cost.

3. The non-transitory processor-readable medium of claim 2, wherein the cost for the operation of the mobile device is a non-zero value when the real-time usage value plus the plurality of usage values exceeds a plan segment of the service level agreement, the plan segment being at least one of a nights-and-weekend plan segment, a mobile-to-mobile plan segment, a peak plan segment, an off-peak plan segment, a shared plan segment or a pooled plan segment.

4. The non-transitory processor-readable medium of claim 1, wherein the first command is at least one of a mobile device shut down command, a voice calling shut command, a block phone number dialing command, a data usage shut down command, a text messaging shut down command, a short message service (SMS) shut down command, or a web browsing shut down command.

5. The non-transitory processor-readable medium of claim 1, wherein the first command is at least one of a window popup user notification, an email message notification, a text message notification, a short message service (SMS) message notification or a device output notification.

6. The non-transitory processor-readable medium of claim 1, wherein the first signal is received from an agent at the mobile device, the agent is configured to determine the real-time usage value based on operation of the mobile device.

7. The non-transitory processor-readable medium of claim 1, further comprising code to cause the processor to:
ascribe an unforeseen cost based on the real-time usage value associated with operation of the mobile device and the service level agreement;
compare the ascribed cost and the actual cost charged by the carrier; and
correct the ascribed cost based on the comparison.

8. A non-transitory processor-readable medium storing code representing instructions to be executed by a processor, the code comprising code to cause the processor to:
receive from a mobile device at a device separate from the mobile device a signal having a real-time quality-of-service data associated with operation of the mobile device;
receive at the device information on a service level agreement for the mobile device, the service level agreement being between a carrier and a carrier customer; and
send a command from the device to an enterprise telecommunications manager associated with the mobile device when the operation of the mobile device crosses a threshold condition of the service level agreement, the command having an indication of a contractual monetary remedy due from a carrier associated with the service level agreement when the quality of service falls below contractually agreed service levels.

9. The non-transitory processor-readable medium of claim 8, further comprising code to cause the processor to:
calculate the contractual monetary remedy based on the real-time quality-of-service data and the service level agreement.

10. The non-transitory processor-readable medium of claim 8, further comprising code to cause the processor to:
receive from a database a plurality of quality-of-service data associated with prior operation of the mobile device;
calculate an average quality-of-service data based on the real-time quality-of-service data and the a plurality of quality-of-service data; and
calculate the contractual monetary remedy based on the average quality-of-service data and the service level agreement.

11. The non-transitory processor-readable medium of claim 8, wherein the real-time quality-of-service data is availability data, the threshold condition is an availability rate value.

12. The non-transitory processor-readable medium of claim 8, wherein the real-time quality-of-service data is dropped-call data, the threshold condition is a dropped call rate value.

13. A non-transitory processor-readable medium storing code representing instructions to be executed by a processor, the code comprising code to cause the processor to:
send from a mobile device to a device separate from the mobile device a first signal having a real-time usage value associated with operation of the mobile device and a second signal having a real-time quality-of-service data associated with operation of the mobile device;
receive at the mobile device from the device a third signal having a first command when the real-time usage value indicates that the operation of the mobile device has crossed a first threshold condition of a service level agreement for the mobile device and a fourth signal having second command when the operation of the mobile device crosses a second threshold condition of the service level agreement, the second command having an indication of a contractual monetary remedy due from a carrier associated with the service level agreement when the quality of service falls below contractually agreed service levels; and
implement an operational change at the mobile device in response to the first command.

14. The non-transitory processor-readable medium of claim 13, wherein the first threshold condition is associated with a cost for the operation of the mobile device based on the service level agreement, the real-time usage value and a plurality of usage values associated with prior operation of the mobile device.

15. The non-transitory processor-readable medium of claim 13, wherein the first threshold condition is associated with a cost for the operation of the mobile device, the cost for the operation of the mobile device is a non-zero value when the real-time usage value plus a plurality of usage values associated with prior operation of the mobile device exceeds a plan segment of the service level agreement, the plan segment being at least one of a nights-and weekend plan segment, a mobile-to-mobile plan segment, a peak plan segment, an off-peak plan segment, a shared plan segment or a pooled plan segment.

16. The non-transitory processor-readable medium of claim 13, wherein the first command is at least one of a mobile device shut down command, a voice calling shut command, a block phone number dialing command, a data usage shut down command, a text messaging shut down command, a short message service (SMS) shut down command, or a web browsing shut down command.

17. The non-transitory processor-readable medium of claim 13, wherein the first command is at least one of a window popup user notification, an email message notification, a text message notification, a short message service (SMS) message notification or a device output notification.

18. The non-transitory processor-readable medium of claim 13, further comprising code to cause the processor to:
   measure at the mobile device real-time usage data associated with operation of the mobile device;
   determine the real-time usage value based on the real-time usage data.

19. The non-transitory processor-readable medium of claim 18, wherein the real-time usage data includes at least one of roaming status information, voice minutes usage information, data minutes usage information, or access-attempt information.

20. The non-transitory processor-readable medium of claim 13, wherein: the real-time usage value includes at least one of roaming status information, voice minutes usage information, data minutes usage information, or access-attempt information; and the real-time quality-of-service data includes at least one of availability data and dropped-call data.

* * * * *